(12) United States Patent
Hirakawa et al.

(10) Patent No.: US 9,738,519 B2
(45) Date of Patent: Aug. 22, 2017

(54) FUEL REFORMER AND FUEL CELL

(71) Applicant: SUMITOMO PRECISION PRODUCTS CO., LTD., Amagasaki-shi, Hyogo (JP)

(72) Inventors: Makoto Hirakawa, Hyogo (JP); Shigeru Mizukawa, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 47 days.

(21) Appl. No.: 14/772,746

(22) PCT Filed: Mar. 11, 2014

(86) PCT No.: PCT/JP2014/001354
§ 371 (c)(1),
(2) Date: Sep. 3, 2015

(87) PCT Pub. No.: WO2014/156013
PCT Pub. Date: Oct. 2, 2014

(65) Prior Publication Data
US 2016/0023899 A1      Jan. 28, 2016

(30) Foreign Application Priority Data

Mar. 25, 2013   (JP) .................................. 2013-062898

(51) Int. Cl.
*C01B 3/38*      (2006.01)
*B01J 8/02*      (2006.01)
(Continued)

(52) U.S. Cl.
CPC .............. *C01B 3/38* (2013.01); *B01J 8/0465* (2013.01); *B01J 8/0496* (2013.01); *C01B 3/384* (2013.01); *H01M 8/0618* (2013.01); *B01J 2208/0053* (2013.01); *B01J 2208/00504* (2013.01); *B01J 2208/00849* (2013.01); *B01J 2208/02* (2013.01); *C01B 2203/0227* (2013.01); *C01B 2203/0233* (2013.01); *C01B 2203/066* (2013.01); *C01B 2203/0816* (2013.01);
(Continued)

(58) Field of Classification Search
CPC .......... C01B 3/38; B01J 8/0461; B01J 8/0257
See application file for complete search history.

(56) References Cited

U.S. PATENT DOCUMENTS 3,635,682 A * 1/1972 Vine .................. H01M 8/0631
422/203
4,861,348 A   8/1989 Koyama et al.
(Continued)

FOREIGN PATENT DOCUMENTS

CN        1839095 A     9/2006
EP     1 342 694 A1     9/2003
(Continued)

*Primary Examiner* — Matthew Merkling
(74) *Attorney, Agent, or Firm* — Maschoff Brennan

(57) ABSTRACT

A fuel reformer 20 producing a reformed gas by catalysis by using a fuel gas includes a combustion chamber 24, a combustion nozzle 30, an exhausting pipe 15, a gas distribution gap 25, an outer reforming portion 43, a fuel gas introduction pipe 10, and a reformed gas outlet pipe 11. The combustion nozzle 30 is located in the combustion chamber 24. A columnar protruding portion 40 is provided in the combustion chamber 24.

14 Claims, 7 Drawing Sheets

(51) Int. Cl.
   *B01J 8/04*       (2006.01)
   *H01M 8/0612*     (2016.01)
   *H01M 8/124*      (2016.01)

(52) U.S. Cl.
   CPC .......... *C01B 2203/0822* (2013.01); *C01B 2203/0827* (2013.01); *C01B 2203/1288* (2013.01); *C01B 2203/1294* (2013.01); *H01M 2008/1293* (2013.01); *Y02P 20/128* (2015.11)

(56) References Cited

U.S. PATENT DOCUMENTS

| | | |
|---|---|---|
| 4,935,037 A | 6/1990 | Koyama et al. |
| 2004/0187386 A1 | 9/2004 | Wangerow et al. |
| 2006/0191200 A1 | 8/2006 | Maenishi et al. |
| 2008/0090112 A1 | 4/2008 | Lee et al. |

FOREIGN PATENT DOCUMENTS

| | | |
|---|---|---|
| EP | 1 408 003 A1 | 4/2004 |
| JP | 63-093343 A | 4/1988 |
| JP | 2001-151501 A | 6/2001 |
| JP | 2002-326805 A | 11/2002 |
| JP | 2004-299939 A | 10/2004 |
| JP | 2007-320812 A | 12/2007 |
| JP | 2008-222530 A | 9/2008 |

\* cited by examiner

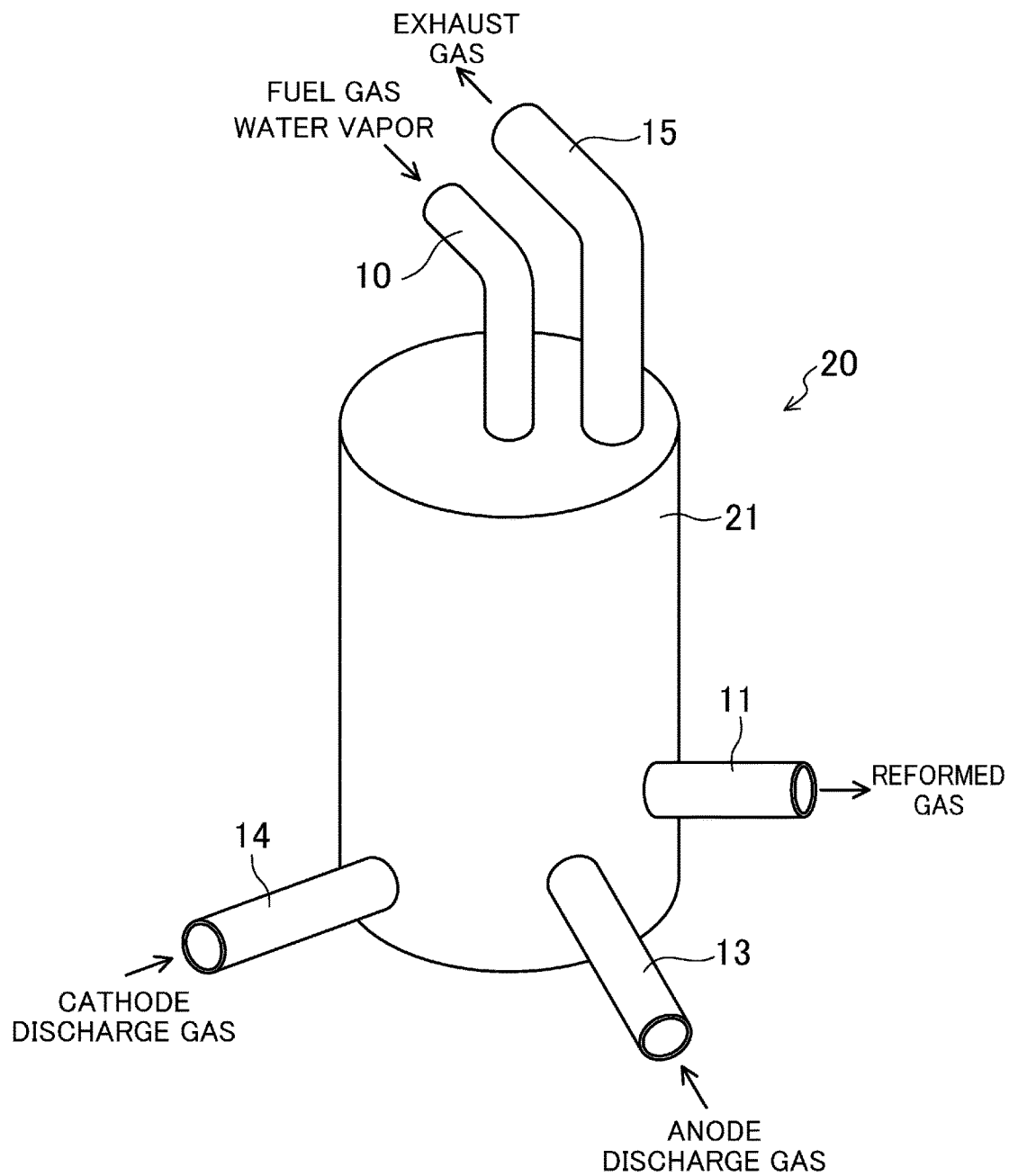

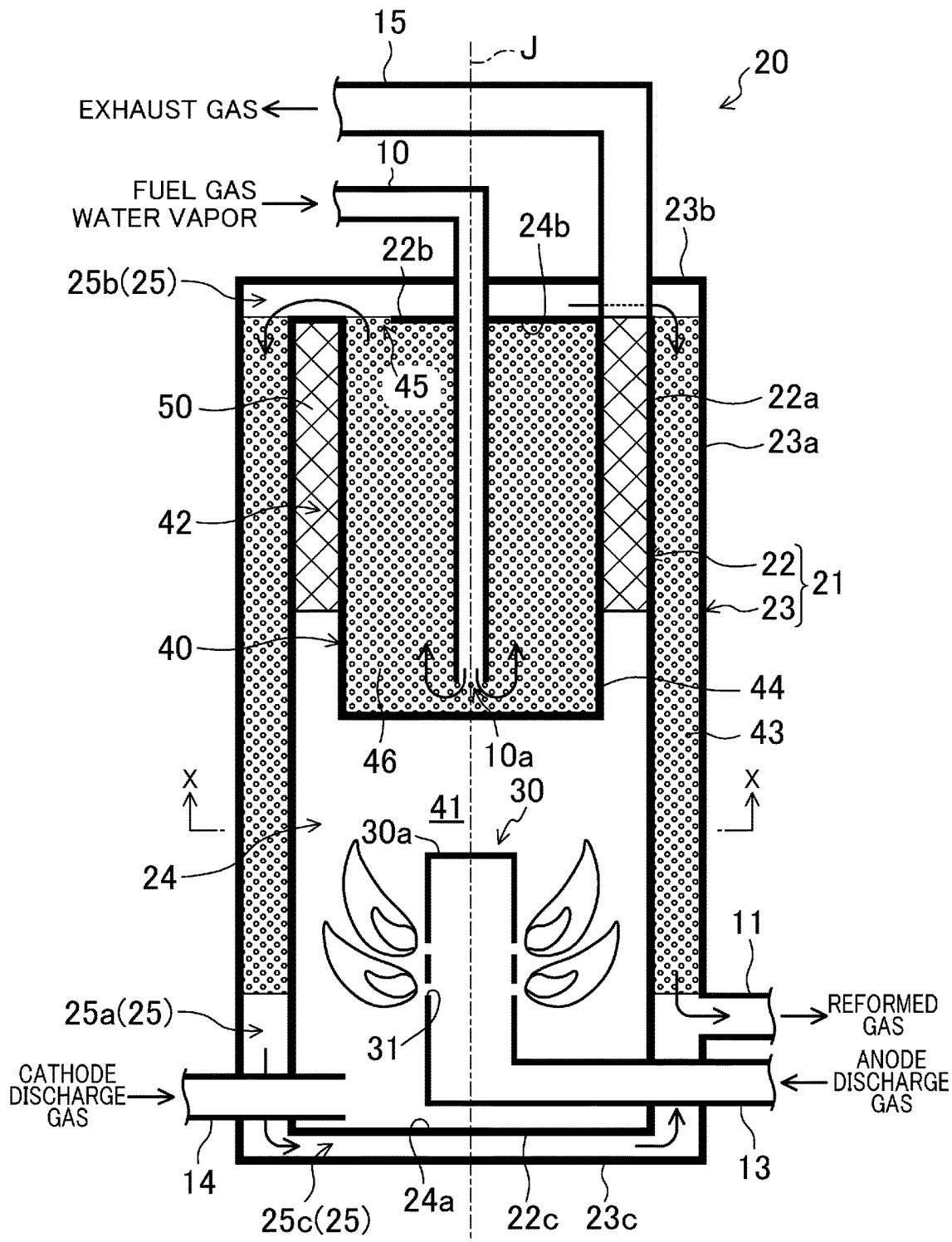

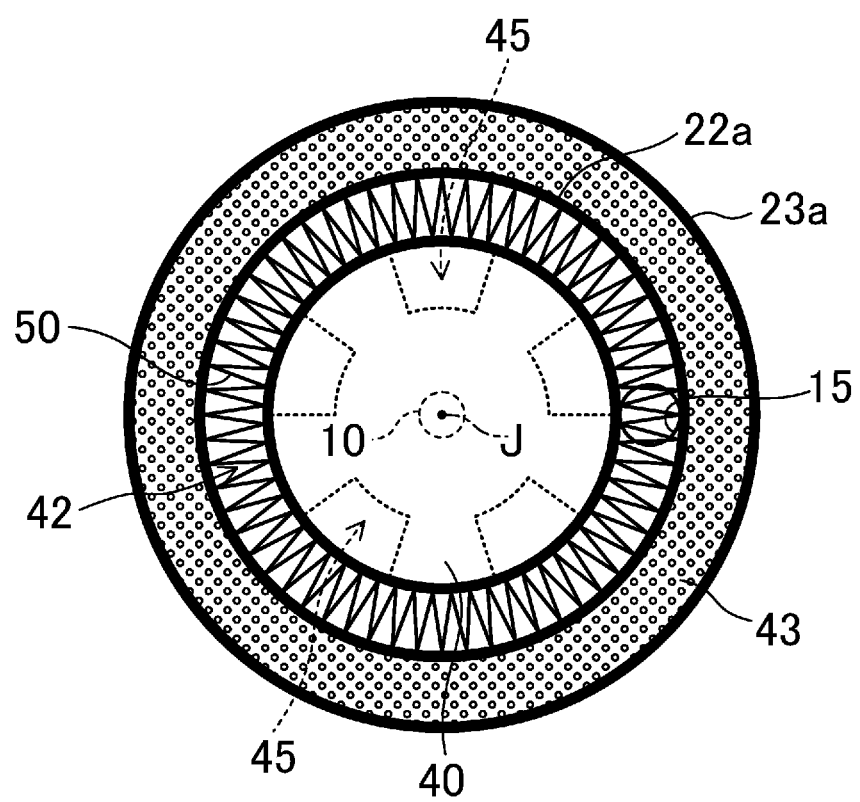

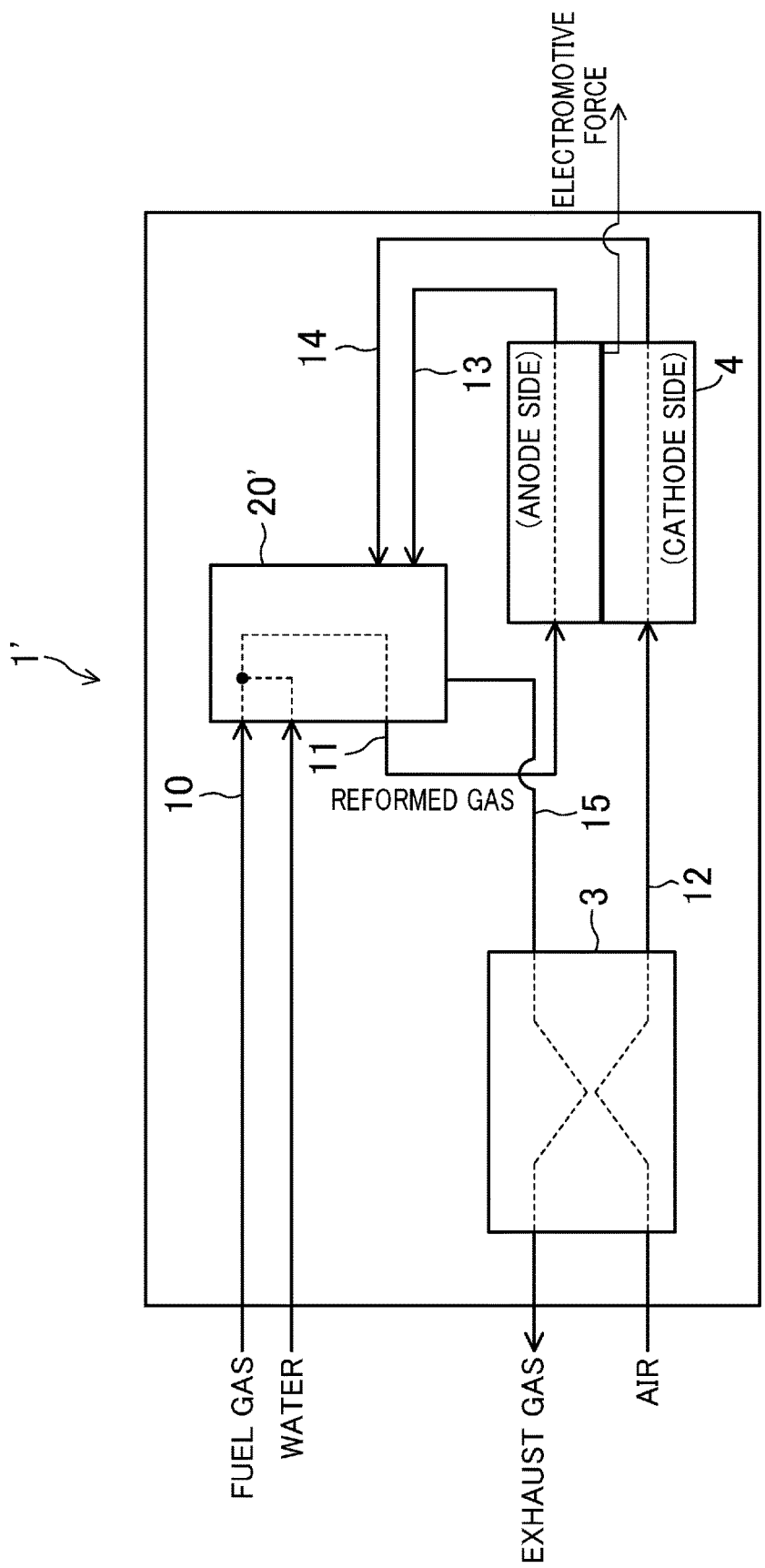

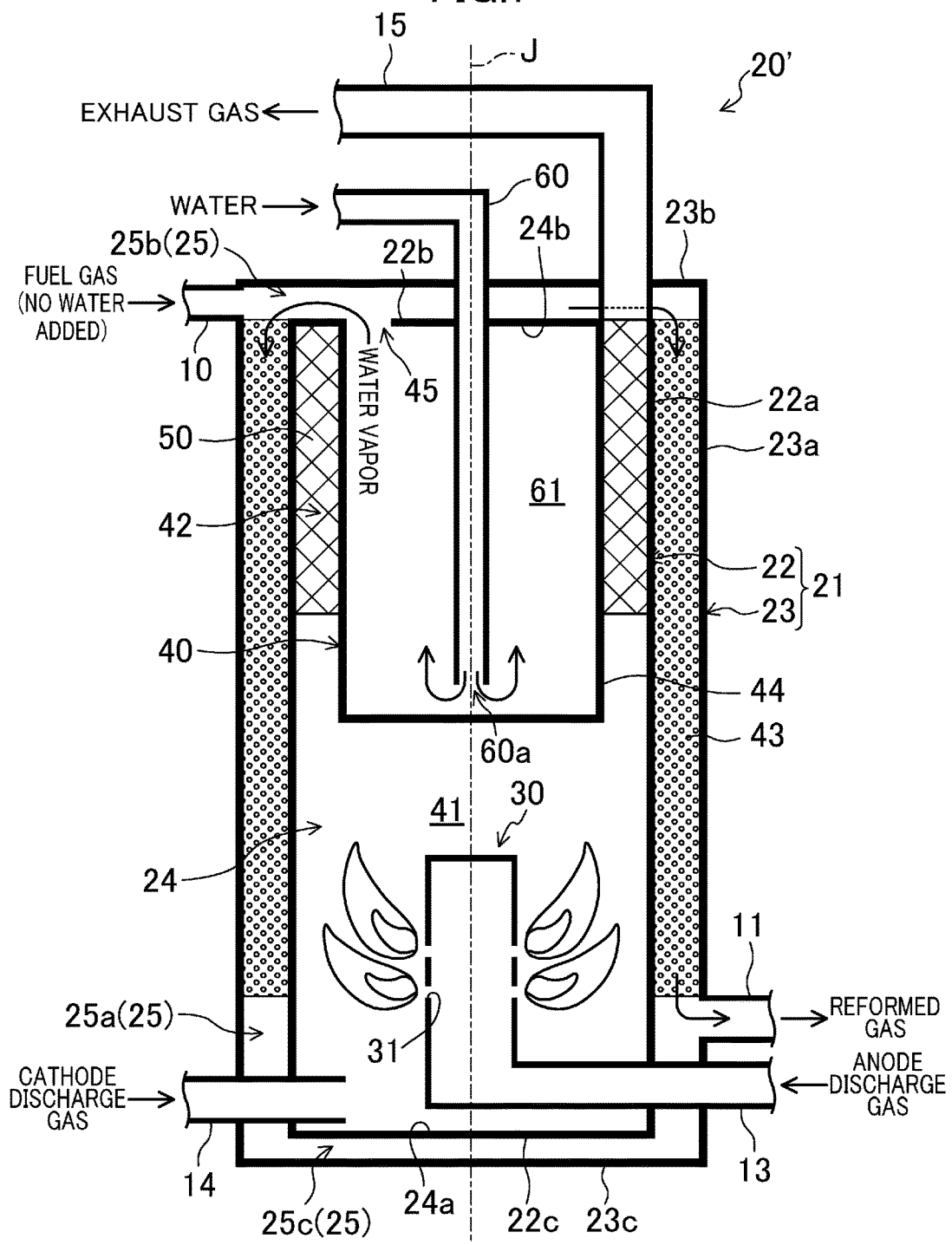

FUEL REFORMER AND FUEL CELL

TECHNICAL FIELD

The present invention relates to a fuel reformer mainly used in a fuel cell.

BACKGROUND ART

FIG. 1 illustrates an exemplary fuel cell. This fuel cell 101 is a solid oxide fuel cell, and generates electric power by using a fuel gas such as a town gas, water, and air. The fuel cell 101 includes an evaporator 102, an air preheater 103, a fuel reformer 104, a burner 105, a power generation cell 106, and other elements.

The evaporator 102 heats water to generate a water vapor. The generated water vapor is mixed with a fuel gas that is, e.g., desulfurized, and is subsequently sent to the fuel reformer 104. In the fuel reformer 104, the mixed gas of a fuel gas and a water vapor is reformed into a high temperature reformed gas primarily composed of hydrogen, and is subsequently supplied to the power generation cell 106.

After being heated in the air preheater 103, the air is supplied to the power generation cell 106. During a stationary operation, the supply of a high temperature reformed gas and air allows the power generation cell 106 to be held in a predetermined operating temperature range between 700° C.-900° C.

The power generation cell 106 includes a plurality of single cells, and in each single cell, an electromotive force is generated through a chemical reaction. For example, a flat plate-type power generation cell includes a cell stack unit made by stacking a plurality of single cells, each of which is formed in a thin plate shape. In the cell stack unit, an electromotive force is generated through a chemical reaction in each single cell while, at a high operating temperature, a reformed gas passes through an anode side of each single cell and air passes through a cathode side of each single cell. The electromotive force is extracted from each single cell to generate electric power.

The altered, high temperature reformed gas and air exhausted from the power generation cell 106 are sent to the burner 105. In the burner 105, the reformed gas and the air are mixed to cause combustion, which heats the fuel reformer 104. An exhaust gas generated in the burner 105 is sent to the air preheater 103 to heat air by a heat exchange, and subsequently exhausted.

Specific configurations of fuel reformers are disclosed in, e.g., Patent Documents 1 and 2.

Patent Document 1 discloses a fuel reformer wherein a reforming catalyst is located in a central portion of the fuel reformer.

Specifically, a vertically oriented combustion gas passage is provided in the fuel reformer, and a reaction tube protruding downward is located in a central portion of the combustion gas passage. A combustor that generates flames is located below the reaction tube, and a protruding end portion of the reaction tube faces the combustor.

An air passage through which air passes is located around the combustion gas passage, and the reforming catalyst is provided only in the reaction tube. The reaction tube has a double tube structure. The reforming catalyst is provided only in an outer peripheral portion of the reaction tube, and not provided in the protruding end portion of the reaction tube.

Patent Document 2 discloses a fuel reformer wherein a reforming catalyst is provided in a periphery of the fuel reformer.

Specifically, a hollow cylindrical combustion chamber that accommodates a burner is installed in the center of the fuel reformer, and a cylindrical reforming catalyst layer is located around the combustion chamber.

CITATION LIST

Patent Document

Patent Document 1: Japanese Patent No. 2528836
Patent Document 2: Japanese Unexamined Patent Publication No. 2004-299939

SUMMARY OF THE INVENTION

Technical Problem

In a fuel reformer, it is necessary to make a temperature high to enable a reforming catalyst to work. Also, for efficient reforming, it is necessary to make a fuel gas including a water vapor be in sufficient contact with a reforming catalyst at a high temperature.

However, each of the fuel reformers of Patent Documents 1 and 2 has a complicated structure, which does not provide efficient reforming. Thus, there is room for improvement here.

For example, in the fuel reformer of Patent Document 1, the reforming catalyst is located only around the reaction tube. Thus, the amount of the reforming catalyst is small, which does not allow the reforming catalyst to be in sufficient contact with a fuel gas. In addition, it is difficult for heat of the combustor to transfer to the reforming catalyst.

In this point, the amount of the reforming catalyst of the fuel reformer of Patent Document 2 is larger than that of the fuel reformer of Patent Document 1, which provides efficient reforming. However, heat of the burner transfers only indirectly to the reforming catalyst.

Therefore, it is a principal object of the present invention to provide a fuel reformer that can provide efficient reforming with a simple structure.

Solution to the Problem

A fuel reformer disclosed herein is a fuel reformer producing a reformed gas by catalysis by using a fuel gas. The fuel reformer includes a body portion in which a combustion chamber tubularly extending between a first end and a second end is provided, a combustion nozzle located closer to the first end side of the combustion chamber and generating a flame by injecting a combustion gas, an exhausting pipe located closer to the second end and exhausting an exhaust gas generated in the combustion chamber, a gas distribution gap isolated from an inner portion of the combustion chamber and provided along an outer shell of the combustion chamber, an outer reforming portion formed by filling the gas distribution gap with a reforming catalyst, a fuel gas introduction pipe located upstream of the outer reforming portion and introducing a fuel gas to the gas distribution gap, and a reformed gas exhaust pipe located downstream of the outer reforming portion and exhausting a reformed gas from the gas distribution gap.

Also, a columnar protruding portion is provided in the inner portion of the combustion chamber. The columnar protruding portion includes an inner space isolated from the combustion chamber, and is separated from the outer reforming portion with a gap interposed therebetween so as to communicate with the fuel gas introduction pipe and the gas distribution gap.

This fuel reformer allows a flame generated by the combustion nozzle to grow, extend toward the second end, and concentrate on a center portion of the combustion chamber. Thus, a portion, of the outer reforming portion, located on the second end side above the combustion nozzle conducts less heat of combustion, and this tends to result in inefficient heating.

Thus, the columnar protruding portion is provided so that a flow of a high temperature exhaust gas collides with a head of the columnar protruding portion, and subsequently enters a cylindrical gap extending along the outer reforming portion. Consequently, heat of combustion of the exhaust gas flow is conducted efficiently to the outer reforming portion.

Specifically, a columnar reforming portion is formed by filling the inner space of the columnar protruding portion with the reforming catalyst. The fuel gas introduction pipe is inserted into the inner space of the columnar protruding portion, and an end portion discharging a fuel gas is located in a protrusion portion of the columnar protruding portion in a state in which the end portion is covered by the reforming catalyst.

In this case, a fuel gas is discharged to the columnar reforming portion from the protruding end portion, of the columnar protruding portion, with which a high temperature exhaust gas flow collides. Thus, reforming is most easily performed immediately after the fuel gas is introduced. Accordingly, efficient reforming is achieved.

Further, in the protruding end portion of the columnar protruding portion, heat of combustion is efficiently absorbed into the reforming catalyst, thereby reducing excessive heating of the partition portion. Consequently, the heat resistance is also improved.

A fuel gas is reformed by passing through both the columnar reforming portion and the outer reforming portion. Thus, a reformed gas is efficiently produced.

More specifically, the head of the columnar protruding portion faces an end of the combustion nozzle with a combustion space interposed therebetween.

Accordingly, a flame is grown sufficiently, and efficient combustion is achieved.

Also, provided are a regulating portion regulating a flame extending from the combustion nozzle toward the head of the columnar protruding portion, and an opening portion injecting the combustion gas from the combustion nozzle toward a surrounding area thereof.

Accordingly, a flame occurs toward the surrounding area of the combustion nozzle, and thus efficient heating of the outer reforming portion is achieved.

A heat transfer member having a thermal conductivity may be fitted into the gap between the outer reforming portion and the columnar protruding portion in a manner that allows air to pass through the gap between the outer reforming portion and the columnar protruding portion.

Accordingly, heat of combustion of an exhaust gas flow that is passing through the gap is conducted to the outer reforming portion and the columnar reforming portion in the columnar protruding portion through the heat transfer member, thereby achieving still further efficient reforming.

Also, the fuel reformer disclosed herein may be equipped with an evaporator.

Specifically, provided is a water introduction pipe including an end portion from which water is discharged. An evaporating portion generating a water vapor is formed by inserting the end portion of the water introduction pipe into the inner space of the columnar protruding portion, and the fuel gas introduction pipe is connected to the gas distribution gap on the second end side.

This fuel reformer does not require an additional evaporator. Thus, a still further simplified structure is achieved.

The fuel cells including such fuel reformers provide improvement in efficient use of heat of combustion.

Advantages of the Invention

The fuel reformer of the present invention has a simplified structure but allows heat of combustion to be sufficiently supplied to a large quantity of reforming catalysts, thereby efficiently producing a reformed gas.

BRIEF DESCRIPTION OF THE DRAWINGS

FIG. 3 is a general perspective view of a fuel reformer according to the embodiment.

FIG. 4 is a general cross sectional view of the fuel reformer according to the embodiment.

FIG. 5 is a general cross sectional view taken along the plane X-X shown in FIG. 4.

FIG. 6 is a general view of a configuration of a fuel cell according to a variation.

FIG. 7 is a general cross sectional view of a fuel reformer according to the variation.

DESCRIPTION OF EMBODIMENTS

Embodiments of the present invention will be described in detail below with reference to the drawings. The following embodiments are merely preferred examples in nature, and are not intended to limit the present invention, applications thereof, or usage thereof.

(Fuel Cell)

Figure 1:
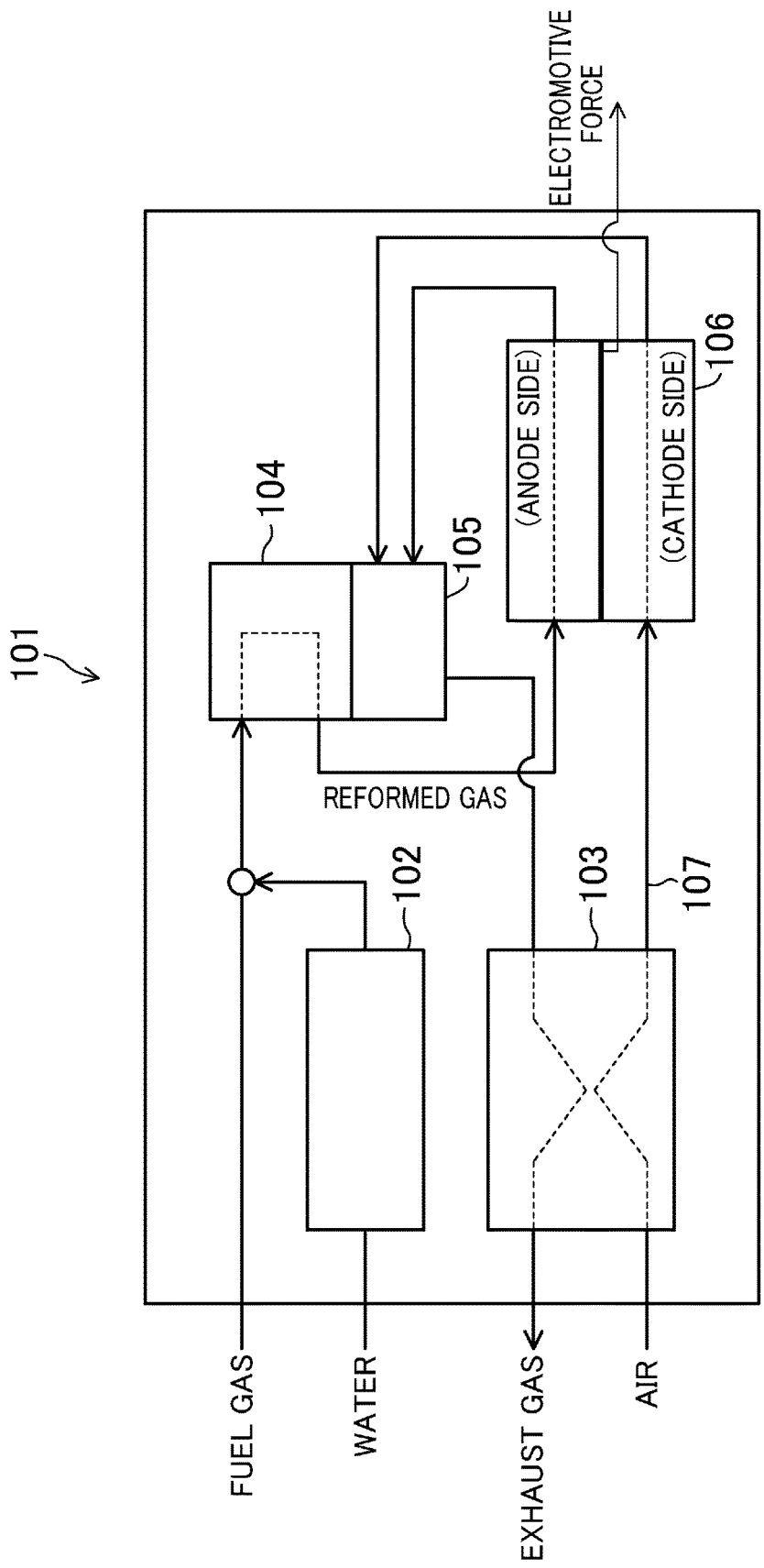
FIG. 1 is a general view of a configuration of a typical fuel cell.
Figure 2:
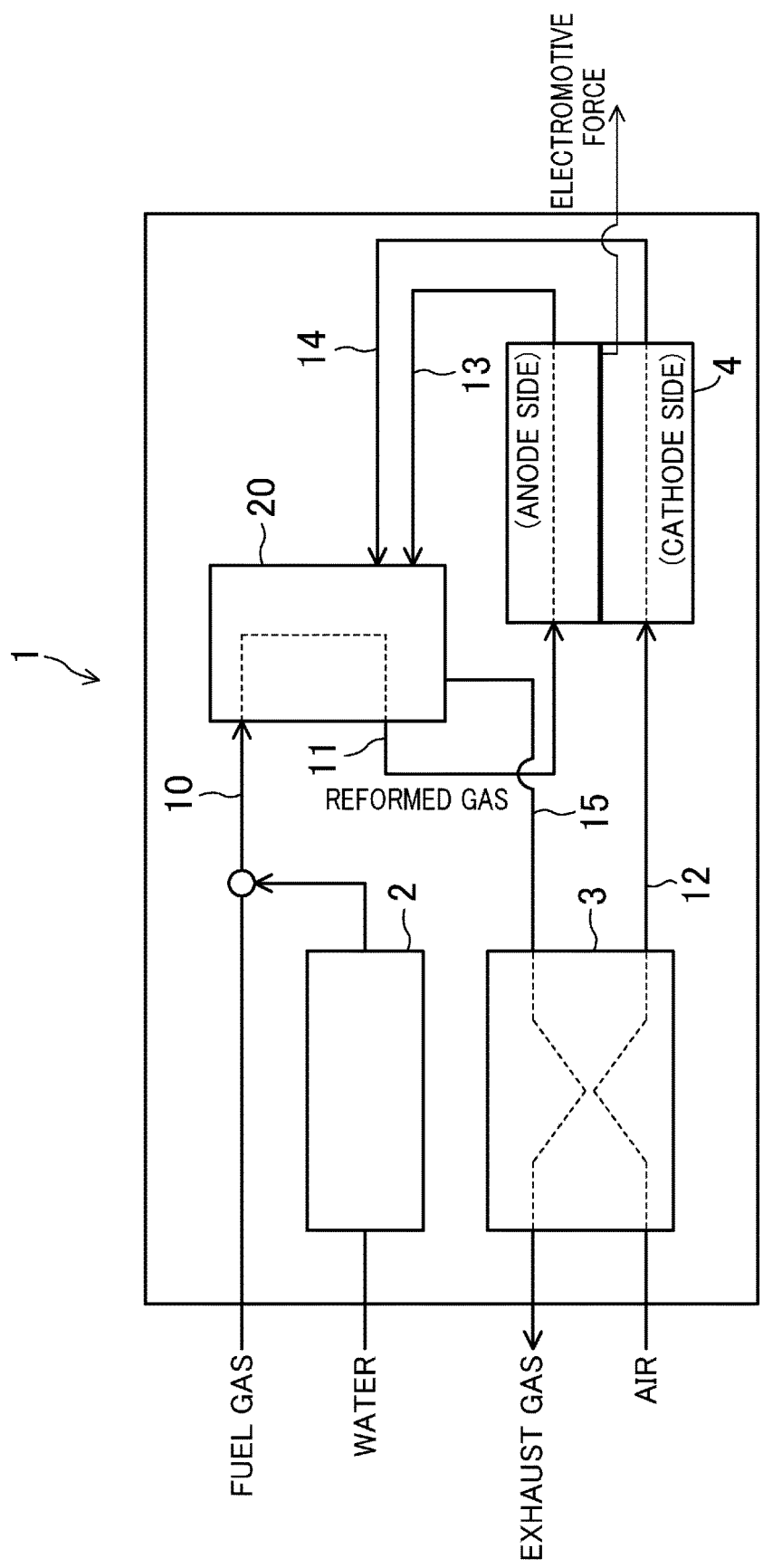
FIG. 2 is a general view of a configuration of a fuel cell according to an embodiment.

FIG. 2 illustrates a configuration of a fuel cell 1 according to this embodiment. This fuel cell 1 is a flat plate-type solid oxide fuel cell 1. Except a fuel reformer 20, there is not much difference between a basic configuration of the fuel cell 1 and that of the above-described fuel cell 101.

In other words, this fuel cell 1 includes an evaporator 2, an air preheater 3, a fuel reformer 20, a cell stack 4, and other elements, and generates electric power by using a fuel gas such as a town gas, water, and air and extracting electromotive force from the cell stack 4.

The evaporator 2 heats water to generate a water vapor. The generated water vapor is mixed with a fuel gas that is, e.g., desulfurized, and is subsequently sent to the fuel reformer 20 through a fuel gas introduction pipe 10. That is, in this embodiment, the fuel gas introduced into the fuel reformer 20 contains a water vapor.

In the fuel reformer 20, provided is a reforming catalyst that works at a high temperature. By catalysis of the reforming catalyst, a fuel gas is reformed into a high temperature reformed gas primarily composed of hydrogen. The produced reformed gas is sent to the cell stack 4 through a reformed gas outlet pipe 11.

The air preheater 3 heats outside air to generate high temperature air (heating air). The generated heating air is introduced into the cell stack 4 through an air introduction pipe 12. A high temperature reformed gas altered in the cell stack 4 (an anode discharge gas (an anode off-gas), which is an exemplary combustion gas) is sent to the fuel reformer 20 through an anode-side exhaust pipe 13. High temperature air altered in the cell stack 4 (a cathode discharge gas (a cathode off-gas)) is sent to the fuel reformer 20 through a cathode-side exhaust pipe 14.

The anode discharge gas contains redundant hydrogen. Thus, a mixture of the anode discharge gas with the cathode discharge gas causes ignition and combustion. An exhaust gas generated in the fuel reformer 20 is sent to the air preheater 3 through an exhausting pipe 15 to heat air, and subsequently exhausted.

(Fuel Reformer)

In this fuel cell 1, a burner and a reformer are integrally installed in the fuel reformer 20, which provides a simplified structure and efficient reforming.

FIG. 3 illustrates an appearance of a main part of the fuel reformer 20. The fuel reformer 20 includes a body portion 21 that is vertically oriented and cylindrical in appearance. The fuel gas introduction pipe 10 is connected to a generally central portion of an upper end surface of the body portion 21. The exhausting pipe 15 is connected to a peripheral portion of the upper end surface of the body portion 21.

The reformed gas outlet pipe 11, the anode-side exhaust pipe 13, and the cathode-side exhaust pipe 14 are located away from one another and connected to a lower side surface of the body portion 21. The fuel reformer 20 is made of heat resistant material.

FIG. 4 illustrates an interior of the fuel reformer 20. As generally illustrated in the drawing, the body portion 21 has a double structure comprised of an inner tube body 22 having a thermal conductivity and an outer tube body 23 larger than the inner tube body 22. Inside the inner tube body 22, formed is a combustion chamber 24 cylindrically extending along a center axis J between a lower end 24a (a first end) and an upper end 24b (a second end).

In the combustion chamber 24, provided are a combustion nozzle 30, a columnar protruding portion 40, a heat transfer member 50, and other elements. Dots represent the reforming catalyst, and meshes represent the heat transfer member 50.

The outer tube body 23 includes a cylindrical outer side wall portion 23a, an outer upper end wall portion 23b closing an upper end of the outer side wall portion 23a, and an outer lower end wall portion 23c closing a lower end of the outer side wall portion 23a, and is configured as an outer shell of the body portion 21. The inner tube body 22 includes a cylindrical inner side wall portion 22a, an inner upper end wall portion 22b closing an upper end of the inner side wall portion 22a, and an inner lower end wall portion 22c closing a lower end of the inner side wall portion 22a, and is configured as an outer shell of the combustion chamber 24.

The inner side wall portion 22a is formed to be smaller in diameter than the outer side wall portion 23a. The inner side wall portion 22a and the outer side wall portion 23a are concentrically, and internally and externally disposed with respect to the center axis J. Accordingly, a cylindrical gap (a tubular gap 25a) is formed between the inner side wall portion 22a and the outer side wall portion 23a.

Also, the inner side wall portion 22a is formed to be shorter than the outer side wall portion 23a in the axial direction, and gaps (an upper gap 25b and a lower gap 25c) are formed between the outer upper end wall portion 23b and the inner upper end wall portion 22b and between the outer lower end wall portion 23c and the inner lower end wall portion 22c, respectively.

The tubular gap 25a, the upper gap 25b, and the lower gap 25c communicate with one another, and are configured as a gas distribution gap 25 along the outer shell of the combustion chamber 24.

The tubular gap 25a located around the combustion chamber 24 is filled with the reforming catalyst to form a cylindrical outer reforming portion 43.

The exhausting pipe 15 passes through the upper gap 25b of the gas distribution gap 25 and protrudes into the combustion chamber 24. An end of the exhausting pipe 15 opens to an edge of an upper end of the combustion chamber 24.

The reformed gas outlet pipe 11 is connected to a lower portion of the outer tube body 23, and communicates with the lower gap 25c. The fuel gas introduction pipe 10 is connected to an upper portion of the outer tube body 23, and is connected to communicate with the gas distribution gap 25 in a position where the fuel gas introduction pipe 10 is separated from the reformed gas outlet pipe 11 with the outer reforming portion 43 interposed therebetween (the detail will be described later).

The anode-side exhaust pipe 13 passes through the tubular gap 25a of the gas distribution gap 25, protrudes into the combustion chamber 24, and is connected to the combustion nozzle 30. The combustion nozzle 30 is disposed on a lower end side of a central area of the combustion chamber 24, and extends upward. The anode-side exhaust pipe 13 is connected to a lower end portion of the combustion nozzle 30.

The combustion nozzle 30 has a circular pipe shape. An end portion 30a of the combustion nozzle 30 is closed, and a plurality of injection holes 31 are arranged radially on a side surface portion of the combustion nozzle 30. Accordingly, a high temperature anode discharge gas is sent to the combustion nozzle 30 through the anode-side exhaust pipe 13, and then injected radially toward a surrounding area of the combustion nozzle 30 from each injection hole 31.

Some holes may be provided on the end portion 30a of the combustion nozzle 30 unless all flames extend toward the columnar protruding portion 40. That is, the combustion nozzle 30 includes at least a regulating portion, which corresponds to the closed end portion 30a of the combustion nozzle 30 herein, preventing the flames from going from the combustion nozzle 30 toward the columnar protruding portion 40, and an opening portion, which corresponds to the injection holes 31 herein, through which a combustion gas is injected from the combustion nozzle 30 to the surrounding area thereof.

Thus, for example, if the combustion nozzle 30 itself does not have such functions, members which function as the regulating portion and the opening portion may be provided in the combustion chamber 24.

The cathode-side exhaust pipe 14 passes through the tubular gap 25a of the gas distribution gap 25 and protrudes into the combustion chamber 24. An end of the cathode-side exhaust pipe 14 opens near the lower end portion of the combustion nozzle 30. Accordingly, a high temperature cathode discharge gas is sent to a lower end portion of the combustion chamber 24 through the cathode-side exhaust pipe 14, and climbs the combustion chamber 24.

Accordingly, the cathode discharge gas and the injected anode discharge gas join to cause ignition so that flames extending toward the outer reforming portion 43 occurs around the combustion nozzle 30. Accordingly, a lower portion of the outer reforming portion 43 is efficiently heated.

The rise of a cathode discharge gas and an anode discharge gas makes flames grow, rise, and concentrate on a center portion of the combustion chamber 24. Consequently, the grown flames concentrate on an area above the combustion nozzle 30, and a temperature thereof becomes high. On the other hand, a surrounding area of the area above the combustion nozzle 30, i.e., a portion, of the outer reforming portion 43, above the middle of the outer reforming portion 43 conducts less heat of combustion, and this tends to result in inefficient heating. Thus, in this fuel reformer 20, the columnar protruding portion 40 is provided to allow the portion, of the outer reforming portion 43, above the middle of the outer reforming portion 43 to easily conduct heat of combustion.

Specifically, in an upper portion of the combustion chamber 24, provided is the columnar protruding portion 40 concentric with the outer reforming portion 43 partitioned by the inner side wall portion 22a with the cylindrical gap interposed between the columnar protruding portion 40 and the outer reforming portion 43. The columnar protruding portion 40 protrudes downward from the upper end side toward the combustion nozzle 30, and a disc-shaped head surface of the columnar protruding portion 40 faces the end of the combustion nozzle 30 with the combustion space 41 interposed therebetween.

The combustion space 41 allocated above the combustion nozzle 30 allows for sufficient growth of flames. A flow of a rising exhaust gas of which a temperature has become high in the combustion space 41 collides with the head surface of the columnar protruding portion 40, and subsequently enters a cylindrical gap (an exhaust gas passage 42) extending along the portion, of the outer reforming portion 43, above the middle of the outer reforming portion 43.

Thus, heat of combustion of the exhaust gas flow is conducted efficiently to the portion, of the outer reforming portion 43, above the middle of the outer reforming portion 43.

Moreover, in this fuel reformer 20, the columnar protruding portion 40 includes a columnar reforming portion 46 to perform more efficient reforming.

Specifically, the columnar protruding portion 40 includes a cylindrical partition portion 44 having a bottom and configured as an outer shell of the columnar protruding portion 40. The partition portion 44 is made of material having a thermal conductivity, and is integrated to an inner surface of the inner upper end wall portion 22b. An opening located in an upper portion of the partition portion 44 is closed by the inner upper end wall portion 22b. Vent openings 45 open in a peripheral portion of the inner upper end wall portion 22b facing an inner side of the partition portion 44 (see FIG. 5). An inner portion of the partition portion 44 communicates with the upper gap 25b through the vent opening 45.

In the upper gap 25b, a discharge-preventing member such as a metal mesh or a non-woven fabric is provided in a boundary portion between the columnar protruding portion 40 and the outer reforming portion 43. Accordingly, a gas flow does not cause the reforming catalyst with which the columnar protruding portion 40 is filled to move toward the tubular reforming portion 43.

The partition portion 44 is entirely filled with the reforming catalyst. Accordingly, in the partition portion 44, a cylindrical columnar reforming portion 46 is formed.

The fuel gas introduction pipe 10 passes through the upper gap 25b, extends into the columnar protruding portion 40, and is inserted into the columnar reforming portion 46. An inlet 10a provided on an end of the fuel gas introduction pipe 10 and discharging a fuel gas is located in a protruding end portion of the columnar protruding portion 40 and opens downward in a state in which the inlet 10a is covered by the reforming catalyst.

A fuel gas introduced to the fuel reformer 20 through the fuel gas introduction pipe 10 is exhausted from the inlet 10a to the columnar reforming portion 46. The inlet 10a is located in the protruding end portion, of the columnar protruding portion 40, with which a high temperature exhaust gas flow collides, and opens downward in a state in which the inlet 10a is buried in the reforming catalyst. Thus, heat of combustion is most easily conducted, and reforming is most easily performed immediately after the fuel gas is introduced. Accordingly, efficient reforming is achieved.

Further, in the protruding end portion of the columnar protruding portion 40, the heat of combustion is efficiently absorbed into the reforming catalyst, thereby reducing excessive heating of the partition portion 44. Consequently, the heat resistance is also improved.

A fuel gas rises up in the columnar reforming portion 46 while being reformed into a reformed gas, and then enters the upper gap 25b through the vent opening 45. A partially reformed fuel gas is homogenized in the upper gap 25b, subsequently enters the tubular gap 25a, and then flows toward the lower gap 25c while being further reformed in the outer reforming portion 43.

Then, the reformed gas produced by reforming the whole fuel gas passes though the lower gap 25c and then is exhausted from the reformed gas outlet pipe 11.

That is, a fuel gas passes through both the columnar reforming portion 46 and the outer reforming portion 43 which are configured to efficiently conduct heat of combustion, thereby efficiently producing a reformed gas.

In this fuel reformer 20, a heat transfer member 50 is arranged to achieve further efficient reforming.

As illustrated in FIGS. 4 and 5, the heat transfer member 50 is made of material having an excellent thermal conductivity, and is fitted into the exhaust gas passage 42 located between the outer reforming portion 43 and the columnar protruding portion 40 in a manner that allows air to pass through the exhaust gas passage 42.

Specifically, the heat transfer member 50 is a cylindrical member formed in a zigzag pattern in the peripheral direction, and is fitted into the exhaust gas passage 42 so that the outer reforming portion 43 is in contact with the columnar protruding portion 40 through the inner side wall portion 22a. Thus, heat of combustion of an exhaust gas flow that is passing through the gap is conducted to the outer reforming portion 43 and the columnar reforming portion 46 in the columnar protruding portion 40 through the heat transfer member 50, thereby achieving still further efficient reforming.

Furthermore, the protruding end portion of the columnar protruding portion 40 protrudes from the heat transfer member 50 so that a lower side of the exhaust gas passage 42 is exposed from the heat transfer member 50.

The "protrude" used herein refers to the state in which the protruding end portion of the columnar protruding portion 40 is exposed from an end surface (located closer to the lower end 24a) of the heat transfer member 50 and protrudes toward the lower end 24a so that a space in which the heat transfer member 50 is not fitted is formed between an outer peripheral portion around a head of the columnar protruding portion 40 and an inner wall of the combustion chamber 24.

Consequently, an exhaust gas flow that has collided with the protruding end portion of the columnar protruding portion 40 is smoothly guided to the exhaust gas passage 42, and heat of combustion is sufficiently conducted across all of the columnar reforming portion 46, outer reforming portion 43, and the heat transfer member 50. Also, the columnar protruding portion 40 absorbs heat of combustion of an exhaust gas flow, which prevents heat of combustion from being excessively added to the heat transfer member 50, thereby reducing degradation of the heat transfer member 50.

(Variations)

FIG. 6 illustrates a configuration of a fuel cell 1' according to a variation. This fuel cell 1' is different from the above-described fuel cell 1 in that the function of the evaporator 2 is incorporated into the fuel reformer 20'. A fuel gas which does not include a water vapor (a fuel gas to which no water is added) is directly supplied to the fuel reformer 20'.

As illustrated in FIG. 6, in this fuel cell 1', the evaporator 2 is omitted from the above-described fuel cell 1. Accordingly, a simplified structure is achieved. The same reference numerals are used to designate members having the same functions as those of the above-described fuel cell 1, and the descriptions thereof are omitted.

FIG. 7 illustrates a fuel reformer 20'. A basic configuration of this fuel reformer 20' is also the same as that of the above-described fuel reformer 20. The same reference numerals are used to designate members having the same functions as those of the above-described fuel reformer 20, the descriptions thereof are omitted, and the differences therebetween will be described in detail.

In this fuel reformer 20', an inner portion of a partition portion 44 configured as a columnar protruding portion 40 is made hollow, and a water introduction pipe 60 including an end portion from which water is discharged is inserted thereto.

Specifically, the water introduction pipe 60 passes through an upper gap 25b, and extends into the columnar protruding portion 40. A water introduction port 60a from which water is discharged is located in the columnar protruding portion 40. Accordingly, water introduced into the fuel reformer 20' through the water introduction pipe 60 is discharged from the water introduction port 60a into the partition portion 44. The inner portion of the partition portion 44 may be filled with stainless wool or other material to disperse water.

Water discharged from the water introduction port 60a immediately absorbs heat and is vaporized to become a water vapor. That is, an inner portion of the partition portion 44 works as an evaporating portion 61 generating a water vapor. Also, in this case, heat of combustion is absorbed as heat of vaporization, thereby reducing excessive heating of the partition portion 44.

A generated water vapor flows into an upper gap 25b through a vent opening 45. This upper gap 25b is connected with a fuel gas introduction pipe 10 that introduces a fuel gas to which no water is added. Consequently, in the upper gap 25b, the fuel gas is mixed with the water vapor.

A fuel gas including a water vapor enters a tubular gap 25a, and then flows toward a lower gap 25c while being reformed in an outer reforming portion 43. Subsequently, a generated reformed gas passes through the lower gap 25c and then is exhausted from a reformed gas outlet pipe 11.

(Others)

Any orientation of a fuel reformer installed may be adopted depending on a specification thereof. For example, a vertically inverted orientation, a horizontal installation, or a tilted installation may be adopted. An upper gap 25b and a lower gap 25c of a gas distribution gap 25 may be also filled with a reforming catalyst. Any configuration of the heat transfer member 50 may be selected. For example, the heat transfer member 50 may be fibrous or porous.

A fuel gas and a water vapor may be separately supplied to a fuel reformer and subsequently mixed in the columnar protruding portion 40.

The lower gap 25c may be omitted. More particularly, the inner lower end wall portion 22c of the inner tube body 22 may be omitted so that the cylindrical inner side wall portion 22a is extended downward to join the outer lower end wall portion 23c, and a lower end of the inner side wall portion 22a is closed at the outer lower end wall portion 23c.

DESCRIPTION OF REFERENCE CHARACTERS 1, 1' Fuel Cell
10 Fuel Gas Introduction Pipe
11 Reformed Gas Exhaust Pipe
12 Air Introduction Pipe
13 Anode-Side Exhaust Pipe
14 Cathode-Side Exhaust Pipe
15 Exhausting Pipe
20, 20' Fuel Reformer
21 Body Portion
22 Inner Tube Body
23 Outer Tube Body
24 Combustion Chamber
24a Lower End (First End)
24b Upper End (Second End)
25 Gas Distribution Gap
30 Combustion Nozzle
31 Injection Hole
40 Columnar Protruding Portion
41 Combustion Space
43 Outer Reforming Portion
46 Columnar Reforming Portion
50 Heat Transfer Member

The invention claimed is:

1. A fuel reformer producing a reformed gas by catalysis by using a fuel gas, the fuel reformer comprising:
   a body portion in which a tubular combustion chamber extending between a first end and a second end is provided;
   a combustion nozzle located closer to the first end of the combustion chamber and generating a flame by injecting a combustion gas;
   an exhausting pipe located closer to the second end and exhausting an exhaust gas generated in the combustion chamber;
   a gas distribution gap isolated from an inner portion of the combustion chamber and provided along an outer shell of the combustion chamber;
   an outer reforming portion formed by filling the gas distribution gap with a reforming catalyst;
   a fuel gas introduction pipe located upstream of the outer reforming portion, introducing a fuel gas to the gas distribution gap, and including an end provided with an inlet discharging the fuel gas; and
   a reformed gas exhaust pipe located downstream of the outer reforming portion and exhausting a reformed gas from the gas distribution gap, wherein:
   in the inner portion of the combustion chamber, provided is a columnar protruding portion:
      including an inner space isolated from the combustion chamber, separated from the outer reforming portion with a gap interposed therebetween so as to communicate with the fuel gas introduction pipe and the gas distribution gap, and protruding from the second end side toward the combustion nozzle, the fuel gas introduction pipe is inserted into a protrusion portion provided in the inner space of the columnar protruding portion and filled with the reforming catalyst, and the fuel gas introduction pipe is configured to discharge the fuel gas from the inlet of which an opening is buried in the reforming catalyst to the protrusion portion of the columnar protruding portion.

2. The fuel reformer of claim 1, wherein:
a columnar reforming portion is formed by filling the inner space of the columnar protruding portion with a reforming catalyst.

3. The fuel reformer of claim 1, wherein:
a head of the columnar protruding portion faces an end of the combustion nozzle with a combustion space interposed therebetween.

4. The fuel reformer of claim 3, further comprising:
a regulating portion provided near the combustion nozzle and regulating a flame extending from the combustion nozzle toward the head of the columnar protruding portion; and
an opening portion injecting the combustion gas from the combustion nozzle toward a surrounding area thereof.

5. The fuel reformer of claim 1, wherein:
a heat transfer member having a thermal conductivity is fitted into the gap between the outer reforming portion and the columnar protruding portion in a manner that allows air to pass through the gap between the outer reforming portion and the columnar protruding portion.

6. A fuel cell, comprising:
the fuel reformer of claim 1; and
a power generation cell, wherein:
a gas produced in the fuel reformer is supplied to the power generation cell.

7. The fuel cell of claim 6, wherein:
a columnar reforming portion is formed by filling the inner space of the columnar protruding portion with a reforming catalyst.

8. The fuel cell of claim 6, wherein:
a head of the columnar protruding portion faces an end of the combustion nozzle with a combustion space interposed therebetween.

9. The fuel cell of claim 8, wherein the fuel reformer further comprises:
a regulating portion provided near the combustion nozzle and regulating a flame extending from the combustion nozzle toward the head of the columnar protruding portion; and
an opening portion injecting the combustion gas from the combustion nozzle toward a surrounding area thereof.

10. The fuel cell of claim 6, wherein:
a heat transfer member having a thermal conductivity is fitted into the gap between the outer reforming portion and the columnar protruding portion in a manner that allows air to pass through the gap between the outer reforming portion and the columnar protruding portion.

11. The fuel cell of claim 7, wherein:
a head of the columnar protruding portion faces an end of the combustion nozzle with a combustion space interposed therebetween.

12. The fuel cell of claim 7, wherein:
a heat transfer member having a thermal conductivity is fitted into the gap between the outer reforming portion and the columnar protruding portion in a manner that allows air to pass through the gap between the outer reforming portion and the columnar protruding portion.

13. The fuel reformer of claim 2, wherein:
a head of the columnar protruding portion faces an end of the combustion nozzle with a combustion space interposed therebetween.

14. The fuel reformer of claim 2, wherein:
a heat transfer member having a thermal conductivity is fitted into the gap between the outer reforming portion and the columnar protruding portion in a manner that allows air to pass through the gap between the outer reforming portion and the columnar protruding portion.

* * * * *